United States Patent [19]

Lynch

[11] Patent Number: 5,857,184
[45] Date of Patent: Jan. 5, 1999

[54] LANGUAGE AND METHOD FOR CREATING, ORGANIZING, AND RETRIEVING DATA FROM A DATABASE

[75] Inventor: Jo Lynch, Cambridge, Mass.

[73] Assignee: Walden Media, Inc., Boston, Mass.

[21] Appl. No.: 646,724

[22] Filed: May 3, 1996

[51] Int. Cl.$^6$ .................................................. G06F 17/30
[52] U.S. Cl. ...................... 707/4; 707/1; 707/3; 707/102
[58] Field of Search .................................. 707/1, 2, 3, 4, 707/5, 102

[56] References Cited

U.S. PATENT DOCUMENTS

| | | | |
|---|---|---|---|
| 5,197,005 | 3/1993 | Shwartz et al. | 707/2 |
| 5,454,101 | 9/1995 | Mackay et al. | 707/3 |
| 5,550,971 | 8/1996 | Brunner et al. | 707/3 |
| 5,557,794 | 9/1996 | Matsunaga et al. | 707/3 |
| 5,659,727 | 8/1997 | Velissaropoulos et al. | 707/2 |
| 5,664,173 | 9/1997 | Fast | 707/4 |
| 5,749,079 | 5/1998 | Yong et al. | 707/100 |

*Primary Examiner*—Thomas G. Black
*Assistant Examiner*—Greta L. Robinson
*Attorney, Agent, or Firm*—Mark P. White

[57] ABSTRACT

A database system comprises a novel process for the organization, storage and retrieval of amorphous or ordered data. The data is organized into data threads, each thread comprising an address code which characterizes and describes the data, and the data body. The address code is organized in a hierarchy having a syntax and morphology similar to the structure of human languages. The language, called REMDL, contains nouns, verbs, relational modifiers, operators, punctuation, and literal strings. The nouns, which signify events, are modified, by means of relational modifier, to form noun declensions, while the verbs, which signify actions, when modified, form verb conjugations. REMDL further contains rules for the time-relationship between events by means of derivatives. By use of this language, data may be quickly and efficiently stored and may be retrieved with a high level of flexibility.

15 Claims, 6 Drawing Sheets

MarketingMedia Compass

Φ

BABY BELLS and Interactive Service Development
    {
        /x00800060[FDC7FD]CF(august 1995)&9950([FDBBFD]632D609335006200DE(bells)B1
    }

MEDIA PLATFORM = Interactive Networks via Telcos
ISSUE = Development of Interactive Infrastructure by Telcos
STATUS = By August 1995 the Baby Bells had back off of many of their earlier plans to build new interactive services. The video networks were suppose to be in million homes by this time but the plans are barely off the drawing board due to costs, politics, and technical glitches.
    Two Baby Bells scrapped applications to the FCC to erect interactive networks. A third Bell won approval-- then quietly ditched its plans. All the Bells are more interested in delivering unadorned cable-TV service for the next few years, then waiting to see if the consumer will demand more.
PROJECTION = Interactive Services (video dial tone, interactive telecommunication & video) is    predicted not to reach more than one quarter of US households by 2000.
OVERVIEW = It should be noted that the FCC has demanded that the telcos specify the technical    specifications they will use when applying for licenses. This demand has been a hindrance to the    telcos who are not sure which technical platform may, be best. New technical solutions are    being developed quarterly.
PROFITS = Local phone service provides the Bells with 90% of their profit.
COST OF INFRASTRUCTURE = According to Forrester Research it would now cost nearly double the    $1,000 per home that most Bells hope to spend to wire up interactive fare.
    One of the costliest, most time-consuming tasks is also one of the most basic, installing new phone lines that can handle video.
BACKGROUND = More than 90% of the Bells' 2.7 million miles of telephone lines is antiquated copper    wiring that can't transmit large volumes of video signals. Rewiring all of the US with fiber    optic lines would cost $120 billion.
Ω

<div align="center">Figure 2</div>

/xF90C[FD42FD]DD.D8.DD

Translation

F9        entertainment
    0C        format, i.e. a stylistic or theme
    [FD42FD]  amusement park, mega park, theme park
    DD.D8.DD  DD.\*\*.DD site base, D8 public Total meaning: public site based entertainment destination in the style of amusement park

LANGUAGE AND METHOD FOR CREATING, ORGANIZING, AND RETRIEVING DATA FROM A DATABASE

MICROFICHE APPENDIX

Appendix A through G attached hereto contains a computer listing on microfiche media, consisting of 2 original fiches containing 100 frames.

BACKGROUND OF THE INVENTION

FIELD OF THE INVENTION

DESCRIPTION RELATIVE TO THE PRIOR ART

The present invention relates to a computer-implemented database storage and retrieval system, and more particularly to such a system having a meta-language interface which mimics the structure of human languages.

We live in the information age. Information is essential for the management of most business ventures, especially in domains such as media and marketing. Information is nearly worthless, however, unless it is organized in a way which allows for simple and rapid retrieval of the desired portions of this information. Data organized in a computer in ways amenable to rapid and comprehensive retrieval is generally referred to as a "database".

Software engineers have been working on the problem of database organization for over four decades. In general, attempts to organize database information have met with serious obstacles in retrieval.

A frequently expressed problem is that the data is not stored in a way that suits the user's needs. Furthermore, most database systems are written in a way that requires a computer software specialist to manages. This specialist deals with retrieval of data by configuring a user's request or "query" in a way to retrieve exactly what the user is looking for. After the data is retrieved, it must be then formatted into a report appropriate for the end user.

One currently popular organization of data is called the "relational database". An "entity-relationship" model is often used, characterizing all elements of a system as either an entity (e.g., a person, place, or thing) or a relationship between entities. Both entities and relationships are represented within the same "table", which forms the basic structure of the database. Thus, in this organization, the database consists of a collection of such tables.

The table may be represented in a two-dimensional form, as rows and columns. Such a form lends itself nicely to display and manipulation on the modem computer system, since computer users are used to dealing with such arrangements in the form of "spread sheets".

As an example, consider a model which is used to manage a parts ordering system. The "entities" in such a system would include both parts and orders. One table may be constructed to show parts, and a second to show orders. A third table may then be generated to show the "relationship" between the parts and the orders.

Such a database model is appropriate for situations in which the data is easily categorized into a small, finite number of categories: parts, orders, prices, dates, etc.

However, other databases contain masses of amorphous material which is difficult to categorize in neat, well-defined units. Such data may be consist of newspaper or magazine stories, memoranda, and the like. Indeed, much of the data in an "amorphous" database may fit equally well in any number of different categories. Consider, for example, a newspaper story concerning a merger between two communications companies. This story will contain a mass of data, including, perhaps, the name of the company executives, the products made by the companies, financial data of the companies, regulations and political policies affecting the companies, etc. Such an amorphous mass of data cannot be easily categorized into neat headings, such as "orders" and "prices".

One approach which has been used to such masses of data is the use of "keywords". Such keywords must be either assigned to the data as it is being entered, or else all the data in the database may be considered "keywords". In the former case, the data must be preprocessed either by human intervention, or by electronic screening of the data. In the latter case, the data processing time during retrieval can be prohibitively long.

In either case, however, the "keyword" approach has a major disadvantage. First of all, the person retrieving the data using the keyword approach must be very clever and experienced to find the data he is looking for. But, more importantly, the keyword approach will not work when attempting to retrieve data by broad categories. Rather, the "keyword" approach requires a rigid adherence to the exact word or phrase appearing in the data.

To recapitulate, the desired result is to produce an organization and retrieval system whereby:

(1) training and expertise in retrieval is kept to a minimum; and (2) the organization of the database lends itself to the management of amorphous data.

Approaches to the first part of this problem include attempts to use a natural language interface to perform queries. This approach was discussed in an article entitled *Natural Language Interfaces: Benefits. Requirements, State of the Art and Applications,* by John L. Manferdelli, A. I. East, October, 1987. This article describes a system in which an English sentence is parsed into its grammatical parts, then translated into a "representation language". This representation language proved to be complex, and not easily understandable. Furthermore, customization to specific applications appeared to be difficult and time consuming.

Other approaches to the natural-language query system include "McELI", a program disclosed in *Inside Computer Understanding,* Schank and Riesbeck, Erlbaum Press, 1981, *LIFER: A Natural Language Interface Facility,* by Gary G. Hendrix, SIGART Newsletter. Issue 61, 1977, pp. 25–26.

None of these approaches has proven successful.

The present invention solves these problems by organizing the data into data threads, each thread consisting of the amorphous data plus an appending address code phrase at the beginning of each data thread to assist in retrieving the data thread.

The address code phrase characterizes the data to follow in a hierarchical manner, starting with the most general characteristic of the data, and descending to the most particular characteristic. The hierarchy chosen mimics a human language, organizing the code into nouns, verbs, and other grammatical types., wherein the nouns and verbs may have modified forms in order to characterize the data with greater specificity. This "meta language" is called REMDL.

In addition to the data threads, the invention comprises a data dictionary, called the "Bible", which contains all the allowable terms in the REMDL language. The Bible also contains the grammatical rules governing the REMDL language.

The REMDL language uses basic root words consisting of two hexadecimal characters each. These may be modified using two-character modifiers, into modified combined forms. Combinations include noun declension forms, and conjugated verb forms. The noun forms generally signify events or objects, while verb forms generally indicate activities.

REMDL nouns include such items as:
Emergence of New Phenomena (an event)
New Correlation in the Market Place (an event)
High speed modem (an object)

Activities, as represented by verbs, include such items as USAGE, which is represented in REMDL by the term "DC". Usage is a broad domain verb phraseology which may comprise such items as:
consumer usage of media=(i.e. consumers use media)
technology usage of cross platforms=(i.e. technology uses cross platforms)
audience usage of content=(i.e. audiences use content)

The analogy of the verb nature of these conjugated terms may be more easily seen in the above examples using the construction on the right-hand side of the equal signs.

REMDL also contains punctuation, much of which is optional. This punctuation is generally for the purpose of making the address code more legible to the human reader. This optional punctuation is ignored by the parser.

Special operators are used to express special relationships between the words in the REMDL sentences. And special word types are included for exceptional cases falling outside the normal rules of grammar.

Like all languages, the rules of grammar and vocabulary are incorporated into the language. In the present invention, this is done by means of the "Bible".

The use of address codes written within the syntax rules of the REMDL language allows the user to query a database with as much or little specificity as desired. At the same time, it does not require that the body of the data itself be organized into any particular form; it may, indeed, be amorphous.

Finally, the use of this system allows data to be scanned into the database, with much of the address codes being automatically generated by the scanning process. In addition to the address codes, the scanning process also produces query codes corresponding to each address code. The query code represents the most concise query syntax possible for the corresponding address code.

The address code and query code are both referred to as "code phrases", and both follow the same rules of syntax in their construction.

The data base system incorporating all of the features recited hereinabove is referred to as "Compass", and is the subject of the present invention.

SUMMARY OF THE INVENTION

A general object of the current invention is to provide a computer-implemented process for database storage and retrieval. A specific object is to provide such a system which is oriented to the organization of amorphous data. A further specific object is to provide such a system which allows for the rapid and efficient querying and retrieval of data from the data base. Another specific object is to provide a method for comprehensive and flexible querying of the data base.

According to one aspect of the invention, a database is organized into data threads wherein each data thread comprises an address code and a data body. The address code characterizes the data in the data body and comprises a multiplicity of code terms organized in a hierarchical form. Retrieval of data is accomplished by querying with a query code made up of terms which appear in the address codes.

According to another aspect of the invention a data dictionary is provided which contains all the allowable terms appearing in the address codes. The terms of the queries are compared to the terms of the dictionary to provide error checking and to facilitate the search.

According to yet another aspect of the invention new data is entered into the database by means of mechanically scanning and converting the scanned data into computer-readable text, then creating a new data thread corresponding to the new data. The new data is automatically searched for key words contained in the dictionary, and when the search produces a "hit" the new query code is appended to the address code of the new data thread.

According to still another aspect of the invention the hierarchy of the address code comprises noun, verbs, representing events and actions. The nouns comprise root terms and one or more root modifiers which form complex extended noun forms called declensions. In a similar manner, the verbs comprise root terms and one or more root modifiers which form complex verb forms called conjugations.

According to a final aspect of the invention a syntax is provided for signifying that the order of the terms in the address codes are significant.

BRIEF DESCRIPTION OF THE DRAWINGS

These, and further features of the invention, may be better understood with reference to the accompanying specification and drawings depicting the preferred embodiment, in which:

FIG. 2 depicts an actual data thread from a Compass data base.

DETAILED DESCRIPTION OF THE PREFERRED EMBODIMENT

A Sample Hierarchy

Before discussing the details of the preferred embodiment, a simple example of a hierarchical structure is described. This example hierarchy is not the actual one chosen for use in the present invention, but is used for illustrative purposes.

Figure 1:
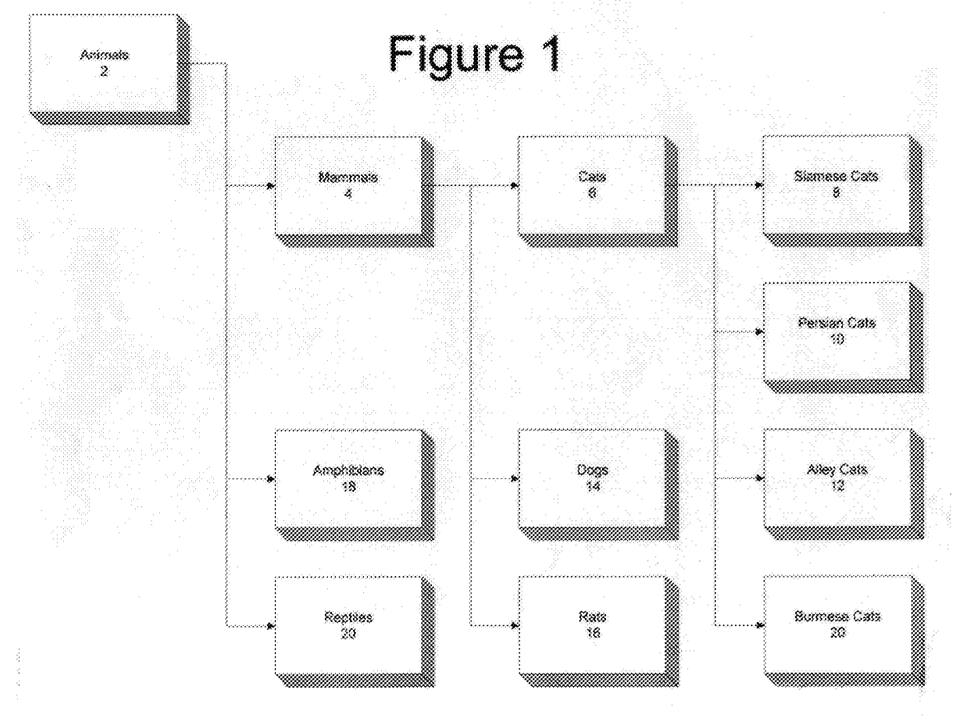
FIG. 1 depicts a sample tree-structured hierarchy.

Consider a data-base entry which contains a volume of textual information which relates to "Siamese cats" "Siamese cats" can be considered as belonging to a hierarchy, as shown in FIG. 1. "Siamese Cats" 8 belongs to the more general group "cats" 6, which may contain, in addition to "Siamese cats", "Burmese cats", "Persian cats" 10, "Alley cats" 12, etc. "Cats", in turn, belongs to the group "mamnmals" 4, which may contain, in addition to "cats", "dogs" 14, "rats" 16, etc. The position of "Siamese cats" in a hierarchy of this kind may be visualized by the tree-shaped structure shown in FIG. 1.

In FIG. 1 the term "animals" 2 is called the "root" of the tree, while the other terms occupy the branches of the tree.

The root is considered the "highest" level of the tree, and one "descends" from the root down the branches. Thus, in FIG. 1 "animal" stands at the highest level of the hierarchy, which is also the broadest level, including, as it does, all of the lower levels of the hierarchy. That is to say, everything which exists in this hierarchy is an animal.

USE OF A HIERARCHICAL ADDRESS CODE

Suppose that we are seeking to organize amorphous data containing information about Siamese Cats to the data base using the system disclosed by the invention. To the front of the textual information relating to Siamese cats, we may append an address code phrase as follows:

{start phrase code}[Animals][Mammals][Cats][Siamese Cats]{end phrase code}

We can now define this entry as a "data thread", which comprises the following:
Start Data Thread Code
Address Code Phrase
Textual Data
End Data Thread Code Now if we wish to query the data base which comprises entries like the above, we do so by comparing the entries in the address code phrase to the desired item. We can, for example, query the data base for mammals, and we will retrieve the above entry, as well as all other entries which contain the term "mammals" in the address code. On the other hand, we may query the data base using the term "Siamese cats", and we will retrieve the above entry, but no other entries except those that contain "Siamese cats" in the address code.

The process may be visualized by considering the tree of FIG. 1 as a group of data paths. We may consider a path starting at Siamese Cats 8 and ascending toward the root (Animals 2). All the data on that path relates to Siamese Cats. However, we may choose to enter the tree at different points along that path, depending upon what level of information we desire.

Now suppose that we wish to query the data base for "Siamese cats". A query code containing the expression "Siamese cats" will retrieve the thread desired. On the other hand, so will a query which contains the expression "Animals". Thus, the hierarchical address code allows us to query the database with as little or as much specificity as desired.

QUASI LANGUAGE AS A HIERARCHY

In order to give this concept more power and flexibility, the address-code scheme has been configured into a human-language-like structure, or Quasi-language, REMDL. Entries into the address code must be part of a group comprising the dictionary of allowable terms. The relation between these terms forms the grammatical structure of the language, and this grammar is governed by a finite set of grammatical rules, similar to the structure of a human language.

The REMDL language uses basic root words consisting of two hexadecimal characters each. These may be modified using two-character modifiers, into modified combined forms. Combinations include noun declension forms, and conjugated verb forms. The noun forms generally signify events, while verb forms generally indicate activities.

The noun declension and verb conjugation forms may be exemplifies by the

[Animals][Mammals][Cats][Siamese Cats]

paradigm, discussed above. In the REMDL forms, a noun declension may be organized as

[Noun root][noun modifier][second noun modifier]

Verb conjugations are similar, but signify that the data contains time-varying characteristics. Note that by characterizing data using both nouns and verbs it is possible to query the database for not only events, but for the time-varying characteristics of the events as well.

AN ACTUAL DATA THREAD EXAMPLE

In the first preferred embodiment the data is organized into blocks of information called threads. An actual, typical thread is shown in FIG. 2.

Referring now to FIG. 2, the thread begins with a heading, in this case "Marketing Media Compass". Following the title is the start character, the symbol φ, and at the end is the end character, Ω. The start and end characters delineated the data thread, and everything between the start character and end character is processed during a query operation.

Following the start character is the title, in this case "BABY BELLS and Interactive Service Development".

Next is the address code. The left curly brace {acts as a start character for the address code, and the right curly brace} is an end character. Between the start and end characters is the address code itself.

Following the address code is the body of the data. In the preferred embodiment the body is separated into parts called Segments, and each Segment is prefaced by a Body Tag. These Body Tags are used to further qualify the data, and are in human-readable form. Each body tag begins a new line, is in capital letters, and is followed by =(an equal sign).

Figure 3:
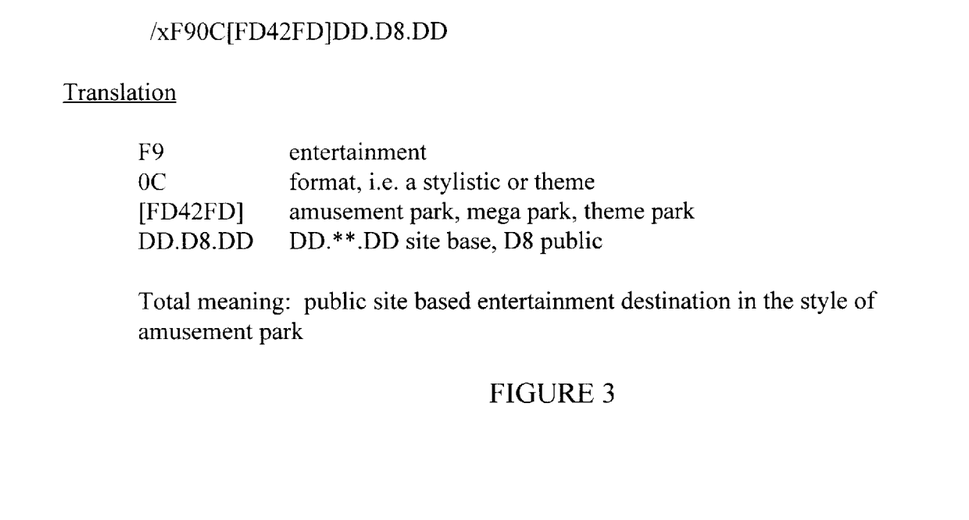
FIG. 3 depicts an actual address code from a Compass database, with annotations.
Figure 4:
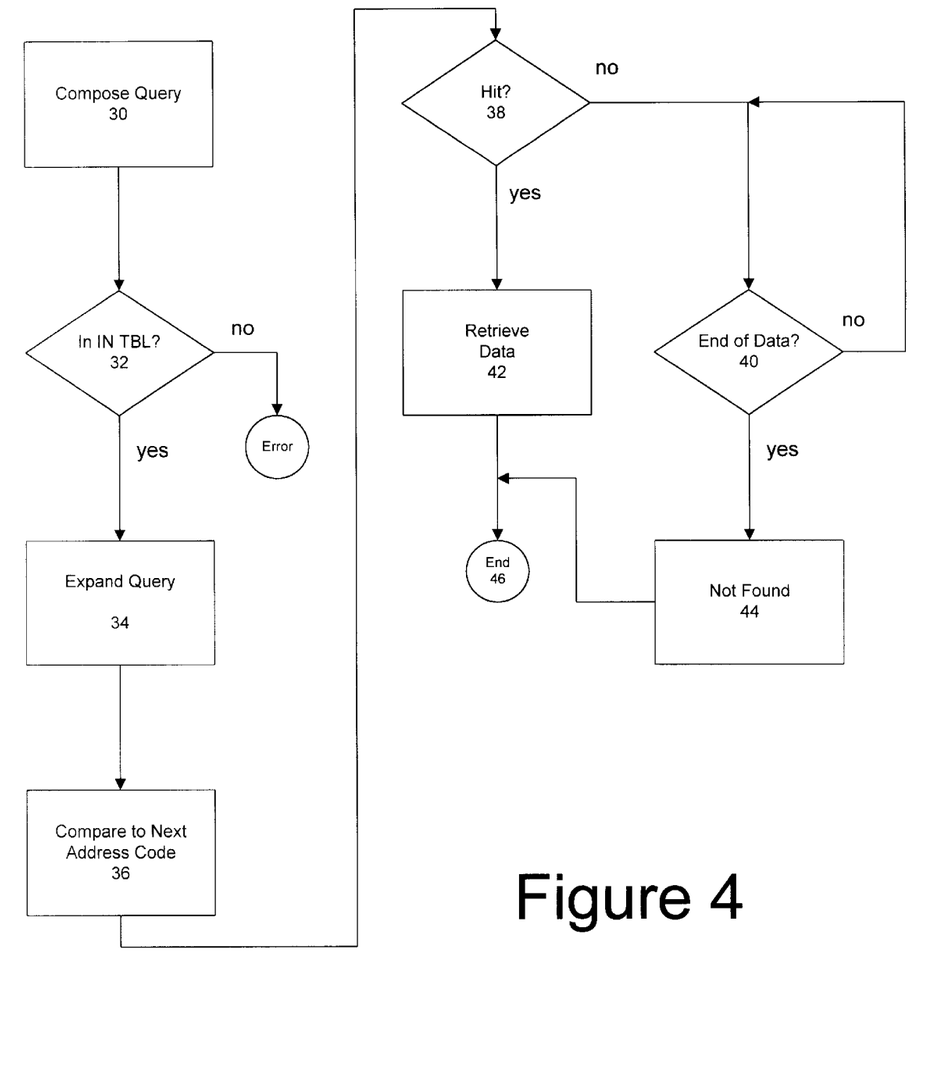
FIG. 4 is a flow chart showing how the Compass database is queried.

The address code is used to further characterize the data for use in later query operations. A sample of an actual address code is shown in FIG. 3.

The address code always begins with

/X it may run for more than one line, and end-of-line characters are ignored. The address code is in polar hexadecimal format, is organized into code fragments, and the order of the fragments is significant. The structure of the address codes, and the rules for its construction are intrinsic to the REMDL language.

REMDL fragments, or "terms" are generally two characters in length. REMDL code may contain punctuation to separate fragments. As in the English language, containing such punctuation as commas, periods, etc., REMDL punctuation contains little information, but is used to clarify or accentuate the existing information. Thus, an English sentence in which required commas are omitted can usually be understood, but often requires additional effort. Likewise, REMDL punctuation simply makes REMDL more easily readable by humans. However, in the machine processing of REMDL address codes the punctuation is ignored.

REMDL punctuation includes the following: square brackets [and], which are used in conjunction with extension codes; parentheses (and), which are used to delineate literal strings; and periods.

Fragments are of several types, namely:
nouns
verbs
relational modifiers
extension codes
operators
punctuation
literal strings
derivatives

NOUNS AND VERBS AND RELATIONAL MODIFIERS

The nouns and verbs may be classified as REMDL words. When nouns are modified, they are said to be declined, similar to the way that the nouns in some languages, such as Greek and Latin, have different forms called declensions, dependent upon the part of the sentence in which the noun appears. For instance, a noun appearing as the subject of a sentence is said to be in the nominative case, and is spelled differently from the same noun appearing as the direct object of a verb, said to be in the accusative case. English contains some vestiges of this type of construction, but only in regards to pronouns: "I" appears in the subject of a sentence, while "we" is used in the object, whether direct or indirect.

In Greek, however, the nouns themselves decline into different cases, depending upon their location in the sentence. For instance:

μαθητης (student) singular nominative case
μαθητε (students) plural nominative

μαθητη (to the student) singular indirect object

μαθητους (to the student) plural indirect object

In the above examples, the root of the word, which appear in every case, consists of the fragment

μαθητ and the declensions are formed by adding the root fragment to the modifier:

μαθητους=μαθητ+ους

Verbs also may be modified according to how they are used, similar to the construction of many modem languages derived from Latin. English retains a few instances of these conjugations. In the verb to be, for instance, the first person take the form "I am", while the third person takes the form "he is".

A better example can be found in Spanish, where the verb "to speak" conjugates in the following way:

| | |
|---|---|
| yo hablo | I speak |
| tu hablas | you (familiar) speak |
| el habla | he speaks |
| nosotros hablamos | we speak |
| vosotros hablais | you (plural familiar) speak |
| ellos hablan | they speak |

The word fragment "habl" can be considered the root verb, since this fragment appears in all of the conjugated forms of the verb. The remainder of the verb is the modifier. Thus "we speak" consists of:

hablamos=habl (root)+amos (modifier)

REMDL models its words in accordance with the above grammatical concepts of human languages, and REMDL nouns are said to decline when they are modified, as the verbs are said to conjugate. Modification of both nouns and verbs are done by the relational modifiers.

Thus the declined noun takes the form of a root term plus a relational noun modifier. Likewise, a conjugated verb takes the form of a root term plus a relational verb modifier.

In the REMDL language the nouns consist of events and objects, while verbs consist of actions. The same root term may be augmented with relational modifiers to become either a noun or a verb.

For example "TV" is represented by the root term 61. The modifier "home" is likewise represented by the term [FD9BFD]. The further modifier DD, representing "site", is also written in modifier form DD.\*\*.DD (where \*\* represents the combined noun term modified by DD. Thus

61DD.[FD9BFD].DD is a declined noun form representing home site-based TV. This noun is an object type, rather than an event.

As an example of a conjugated verb, the same root as above, 61, may be used. When modified by DC, presenting computer usage, the verb 61DC is formed, representing "Television Usage". Similarly, the conjugated verb 61EC represents "Customer Response to Television".

Considering the above examples, it can be seen that characterizing nouns and verbs with a higher degree of specificity provides more flexibility in retrieval of data. For instance, in the noun case above, a query specifying "home-site-based TV" would facilitate a narrow search than simply querying for "TV".

The hierarchy in this case contains TV at the highest level, followed by site, followed by home at the lowest level. Sites could also include, in addition to home, any of the following:
hotel
car
stall
lobby
and so forth. The above items may be found by referring to the "Bible" of Microfiche Appendix A.

DERIVATIVES

Derivatives are used to indicate that the order of terms in the code phrase is significant. Unless derivatives are present, the code phrase may be parsed in any order.

A derivative is denoted by the calculus symbol (y'), for first derivative, (y") for second derivative, etc. The term before the (y') comes before the term after the (y').

As an example, the address code

95(y')62AB46 represents "a media combination event in which a pager is used first before a fax". (95 represents pagers, and 62AB46 represents a combination media event involving a fax". Similarly, 95(y')62(y")54AB46 represents "a media combination event in which a pager is used first before a fax, which is used before a telephone". (54 represents "telephone").

Queries may thus be constructed which search for events in which a pager is used before a fax, which in turn is used before a telephone. Such a query would allow a more selective search than one which simply queried the database for data which contained the terms "pager", "fax", and "telephone".

OPERATORS

Operators express relationships between two arguments, and are one of the following types:

| | |
|---|---|
| & | Join |
| + | Add |
| ~ | Synergistic |

The JOIN operator creates a single noun entity from two separate nouns. The ADD operator, on the other hand, operates on noun events, and creates an aggregate noun event from two separate noun events. The SYNERGISTIC operator expresses a transposable, relatable, or synergistic relationship between the two arguments.

EXTENSION CODES

Extension codes are special expressions which do not fall in the other categories of the language. They have a special syntax, such as:
[FD.XX.FD]
00.XX.00
DD.XX.DD
Where XX is the data within the extension code.

FULL ADDRESS CODE EXAMPLE

As an example of an actual address code as used in a data thread, refer again to FIG. 1. The address code for the data thread shown is /x00800060[FDC7FD]CF(august 1995)&9950[FDBBFD]
632D609335006200DE(bells)B1 which may be analyzed as follows:

| | |
|---|---|
| /x | Start address code |
| 008000 | Video Dial Tone, technology platform of Video delivery via telcos (specific) |
| DA | technology, with telcos and infrastructure will relate to all other telcos technologies and infrastructure technologies (relational) |
| 60 | telecommunication platform relates data to all telcos platforms (relational & specific) |
| [FDC7FD] | infrastructure, this data thread is about a core infrastructure issue (relational) infrastructure issues are the foundation drivers building the new marketplace |
| CF | time |
| (august 1 995) | a date in literal format |
| & | conjunctive syntax |
| 99 | time projection relates data to time driven change drivers (relational) |
| 50 | statistical information that marks the telcos projected event of interactive services (specific) |
| 63 | FCC event is involved in this infrastructure event (specific and relational to politic and culture) |
| 2D | installed base. installed base of interactive telecommunications new services is the infrastructure, change driver data event (specific and relational) |
| 93 | interactive, links the data event to all other interactive events and technologies |
| 35 | new service (relational) |
| 006200 | license, with FCC means an auctioned license event |
| DE | cost of license and infrastructure projection to achieve installed base |
| (bells) | noun structure, the bells are the Baby Bells a Telecomm Industry Group, |
| B1 | industry |

LITERAL STRINGS

A literal string is the commonly used term in computer languages, comprising an exact sequence of characters which are kept together intact. Although in many computer languages the literal string is bracketed by double quotation marks ("), in REMDL parentheses are used for this purpose. See, for instance, (bells) in the address code example of FIG. 2.

BIBLE OF THE REMDL LANGUAGE

As seen by the foregoing, REMDL has a syntax and morphology, as in any other language. Unlike most human languages, however, the syntax is logically consistent, and does not contain the exceptions of the kind which arise in human languages as a result of excessive use. Consistency of the syntax is not absolutely necessary, but it reduces the processing significantly.

And like human languages, REMDL has a vocabulary which is fixed in the form of a dictionary of allowable terms. In addition to a description of each term, the dictionary indicates the hierarchy of the term for use in processing. For instance, in the non-REMDL example of "Siamese Cats" above, the dictionary would indicate the entire hierarchy:

[Animals][Mammals][Cats][Siamese Cats]

so that the scanner, upon reading the term "Siamese Cats", could place the entire hierarchy in the address code phrase.

The REMDL dictionary is called the BIBLE. Consider now as an actual REMDL example the address code

681C2BD4.AC._AB43.AC.

This code is parsed as follows:

| | |
|---|---|
| 68 | print |
| 1C | book |
| 2B | comic book |
| D4 | hardcover comic book |
| AC | attribute structure in code phrase |
| — | no meaning, punctuation |
| AB | media |
| 43 | traditional |
| AC | attribute, two attribute structures in code phrase |

Thus the meaning of this REMDL phrase is "traditional print media in the theme of comic book manifested in hardcover". In analyzing this phrase, note that "print" occupies the highest order in the hierarchy, that "book", the next lowest term, is a type of "print", that "comic book" is a type of "book", etc. Note further that "traditional media" is a further attribute of the phrase, which may be seen in its totality as a noun form.

In the REMDL example, assume that the system were used to scan in a magazine article, and that in the scanning process the term "comic book" was encountered. The processing in this case would determine, from the REMDL BIBLE, that "comic book" belonged to the hierarchy

681C2BD4.AC._AB43.AC and could then insert the entire hierarchy into the address code of the data thread being created.

A portion of the current Compass Bible appears in the Microfiche Appendix. Referring to Microfiche Appendix A, it is seen that the Bible comprises four columns of information corresponding to each Bible entry.

The first column, labeled "Attribute Entry", is an English-language description of the entry. The "level" column indicated the number of the hierarchical level of the entry. The "Query Code" contains the most concise REMDL code phrase which may be used to retrieve this item from a data thread. And the "Address Code" is the fully expanded REMDL description of the entry, indicating the most verbose description of the data entry possible.

Referring back to the example of the address code

681C2BD4.AC._AB43.AC.

discussed above, this code appears in Microfiche Appendix A as line 265. Referring to line 265, column 1 contains the description of the entry, which in this case is "Book, Comic Book Format, Hardcover Print." Column 2 indicates that this entry occupies the highest level of the hierarchy, level 1. Note, however, that this entry is a noun declension, which itself is a hierarchical form. Column 3 of line 265 is the query code, in this case /xD42B. This query code is the most concise query which may be used to retrieve the entry of line 265 when it appears in an address code, although more verbose forms may always be used.

Note that column 1 of the Bible of Microfiche Appendix A uses Tabs to indicate hierarchical level of the entry. For instance, line 5 contains ABC Sports, a level 1 entry. Line 20, "ABC Prime Time" is a level 2 entry, which is a "branch" of line 5, and is preceded by a single Tab. Line 21 is a branch of line 20, and therefore a level 3 entry, and preceded by a double Tab. And so on.

Construction of the Bible is generally a manual process. As new data is added to the database it will be necessary from time to time to upgrade the Bible to include new terms appearing in new data. Updating the Bible will be seen to be analogous to updating the dictionary of a human language to accommodate a changing vocabulary and new usages of words.

THE BODY TAGS

Part of the database organization in accordance with the present invention provides body tags in the body of the data. These Body Tags are used to provide additional organization to the otherwise amorphous data in the data body. In the example depicted as FIG. 2, for instance, the body tags include
MEDIA PLATFORM=
ISSUE=
STATUS=
PROJECTION=

These body tags may be thought of as titles, or headings of various sections of the body. They are currently inserted manually by a programmer or operator familiar with the subject matter of the data, and may or may not conform to a fixed set of possible body tags.

THE QUERY PROCESS

Data is accessed from the data base by means of a query. The query defines what data the user desires to locate with varying degrees of specificity. In its simplest form the user may simply request exact "hits" on all data which contain a term in its exact level in the hierarchy. In the non REMDL "Siamese Cat" example, the user might interrogate the database to find all data threads referring to "Siamese Cats". Or he may interrogate the database to find all data threads containing "Mammals".

The form of the query is called a "query code", and the format of the query code is similar to that of the address code, and follows the same rules of construction. It must begin with the same "start characters", /x and follows all the other rules of the REMDL syntax as well. The REMDL minimum description of a particular data item is found in the Bible, as exemplified in FIG. 7. Note, however, that a data query may request data containing a number of different query codes. Such complex queries are in the form of intersections, or "AND" functions. That is, a complex query containing query code 1 and query code 2 searches for data threads which contain both the query code 1 AND query code 2. Data threads containing only query code 1 or query code 2 alone will not be retrieved by such a complex query.

There is no theoretical limitation to the number of disparate query codes which may be contained within a single complex query.

Figure 5:
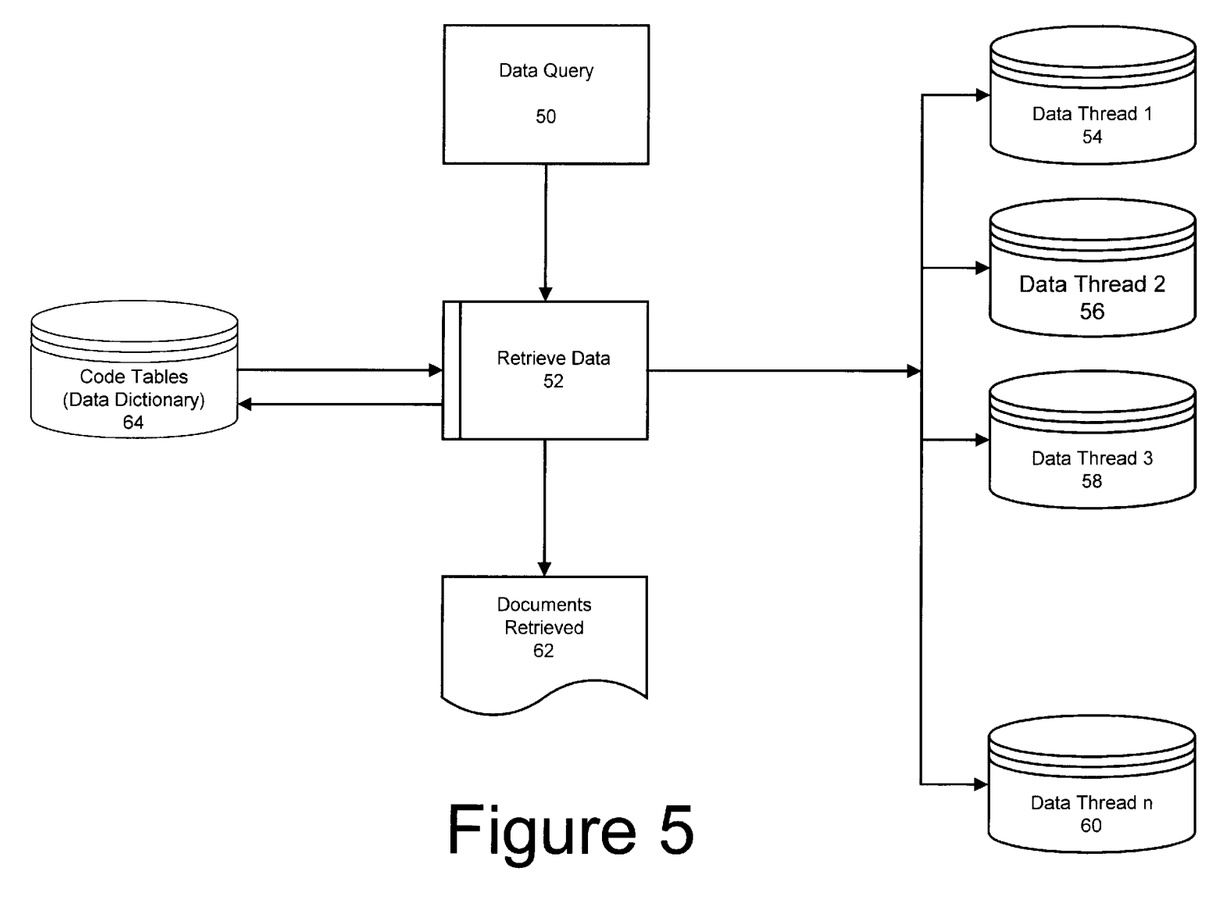
FIG. 5 depicts the organization of the Compass query system.

FIG. 5 shows the query process. The data query 50 is constructed and input into the system. The data retrieval process 52 interfaces between the bible 64 and the data threads 54–60. The notation "Data thread n" 60 indicates the last of an indefinite number of data threads in the data base. The data query is first compared to the entries in the bible to retrieve appropriate query entry. If required, the query may be augmented by the bible entry to produce the desired level of detail of retrieval. Subsequently, the augmented query is then compared to the address code of each of the data threads in the data base. When the comparison between the augmented query string and the address codes result in "hits", the "hits" are then output in the form of the retrieved documents 62.

The use of REMDL language query codes allows the data base to be queried on one or more different levels. We may thus search the database for nouns in the form of either events or objects, or verbs indicating actions resulting from events. We may also search for events which take place is a specific order. And we may search for other data characteristics which may be as general or as specific as desired.

Because the current invention searches only the address code of each data thread, the search proceeds very rapidly and efficiently as compared to a key-word search through an entire data base, in accordance with several current systems.

The grammar for the query process (as well as additional related processes) of the preferred embodiment of the present invention is set forth in Microfiche Appendix B hereto. Also attached are Microfiche Appendices C, D, E, F, and G, which are program libraries referenced by the program of Microfiche Appendix B, and required for its execution. The notation of the grammar in these Microfiche Appendices are in a standard form well known to those skilled in the art, and will enable a skilled programmer to generate code.

CREATING THE DATA THREAD

The data base consists of a number of data threads appended together. These threads may be created by one of three methods: They may be created manually, automatically, or by a mixture of the two methods.

MANUAL CREATION OF THE DATA THREAD

By manual input is implied that a programmer or operator inputs the body data in some form and then modifies the body to add the necessary additional data, including the address code and, if desired, the body tags.

The address code is created by referring to the REMDL dictionary. The programmer inputs the REMDL terms to whatever level of definition is appropriate for the data in question, following the rules REMDL rules of syntax.

Following input of the address code, the programmer may analyze the syntax of the address code by a program provided for this purpose, insuring that the address code is consistent with the REMDL language.

AUTOMATIC SCANNING AND PROCESSING OF THE DATA BASE

Figure 6:
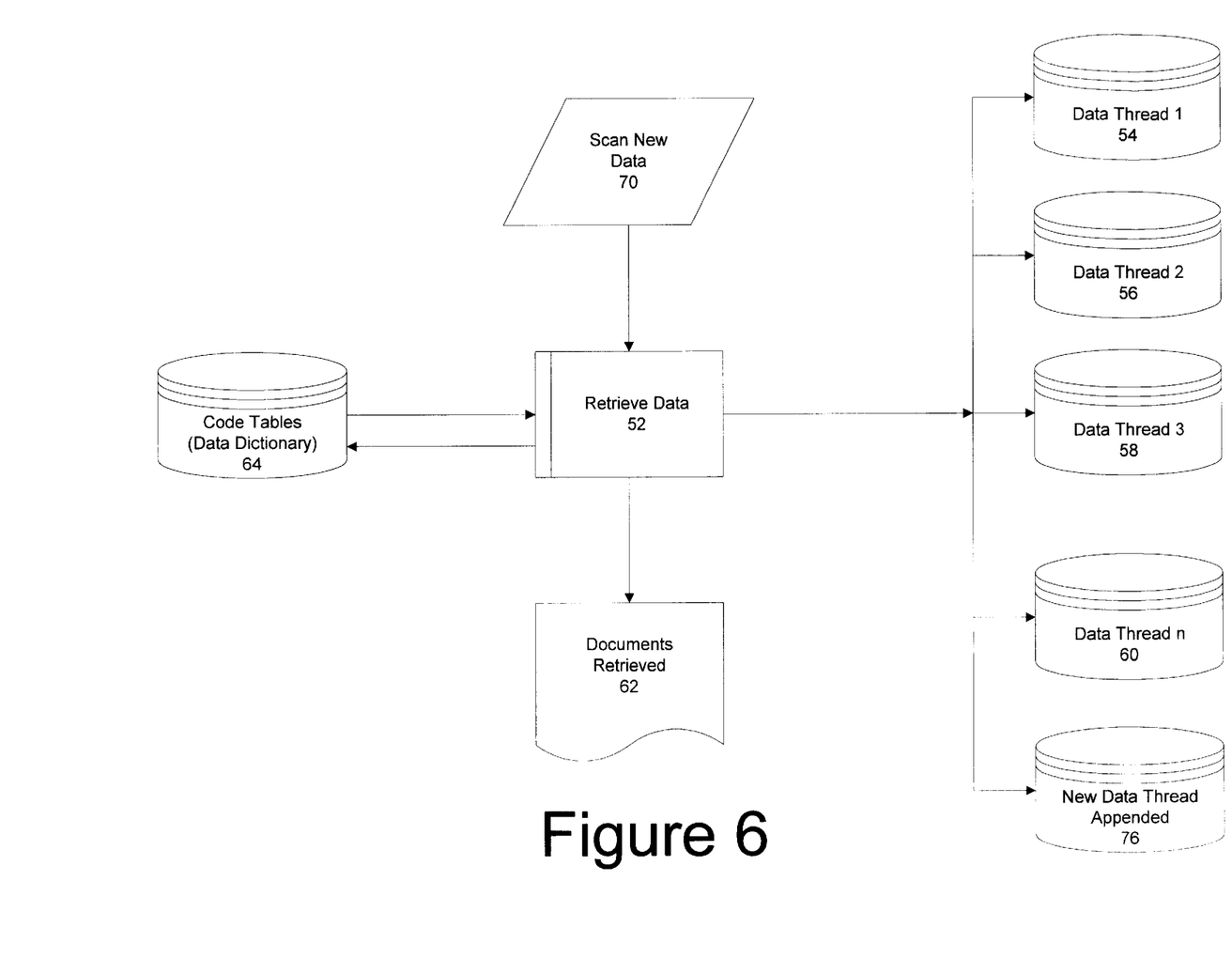
FIG. 6 depicts the organization of the automatic scanning of data into the Compass system.

One of the benefits of the present invention is its ability to organize new data by means of automatically scanning and process of the new data. The process is shown in FIG. 6.

A mechanical scanner is used to convert the data into a graphic image, and some type of OCR (Optical Character Recognition) system converts this information into text for further processing. This combined operation is indicated in FIG. 6 as "Scan New Data" 70. Next, the entire text scanned is compared to the Bible 64 and text which appears in the Bible is retrieved in the form of query codes. These query codes are appended together to form a new address code which is then appended to the beginning of the scanned data, to form a New Data Thread 76 which is then appended to the existing data base. At the same time, the New Data Thread is output in the form of a Report 74, so that manual modification of the new data may take place.

MODIFIED SCANNED INPUT

Automatic Scanning of the data to update the data base may not produce exactly the results desired. Therefore, manual manipulation of the new data thread is often required. As a result, the invention provides means for manually modifying the new data thread in two ways:
(1) the address code may be modified; and
(2) body tags may be added to the body of the data to make the body data more easily readable by a human being.

A special editor is provided for this purpose. The editing of the data threads is not necessarily done at the time of data input, since continued operation of the system may disclose ways in which the database should be updated.

While the invention has been described with reference to specific embodiments, it will be apparent that improvements and modifications may be made within the purview of the invention without departing from the scope of the invention defined in the appended claims.

I claim:

1. A computer-implemented process for database organization, storage and retrieval comprising:
   a) organizing the database data into data threads wherein, for each data thread:
      i) the data thread comprises an address code and a data body;
      ii) the address code characterizes the data in the data body;
      iii) the address code comprises a multiplicity of code terms; and
   b) inputting additional data by mechanical scanning means and organizing said additional data into data threads;
   c) appending said additional data to the existing database;
   d) retrieving data from the database by comparing one or more queries in the form of query codes with the address code of each of the data threads in the data base;
   e) producing a hit for each data thread whose address code contains the query code;
   f) displaying the data threads corresponding to each hit;
   g) providing a data dictionary in the form of a Bible, wherein the Bible contains a multiplicity of entries, each entry comprising:
      i) a description of the entry;
      ii) a query code for the entry; and
      iii) an address code for the entry;
   h) constructing queries satisfying the description in accordance with the query codes in the Bible;
   i) constructing address codes satisfying the description for each data thread in accordance with the address codes in the Bible;
   j) creating a new data thread corresponding to the new piece of data, the new data thread comprising an address code and a data body;
   k) converting the scanned data into computer-readable text;
   l) searching the text for key words contained in the Bible, and retrieving a new address code when the search produces a hit;
   m) appending the new query code to the address code of the new data thread;
   n) repeating the above steps until the text has been completely searched; and
   o) appending the new data thread to the existing database, and
wherein the code terms form a meta-language, comprising nouns representing events and objects and verbs representing actions, the nouns comprise root terms and one or more root modifiers which, together with the root terms, form noun declensions, and the verbs comprise root terms and one or more root modifiers which, together with the root terms, form verb conjugations.

2. The process of claim 1, wherein the code terms in the address codes further comprise derivatives which signify that the sequence of other code terms in the address code is significant.

3. The process of claim 2, further comprising, for each query code, comparing the query code with the query codes of the Bible, producing error reports therefrom.

4. The process of claim 3, wherein the data body of each thread comprises a multiplicity of segments, each segment beginning with a body tag which serves as a heading to describe the segment.

5. The process of claim 4, further comprising adding new entries to the Bible to accommodate additions to the meta-language.

6. A computer-implemented process for database organization, storage and retrieval comprising:
   a) organizing the database data into data threads wherein, for each data thread;
      i) the data thread comprises an address code and a data body;
      ii) the address code characterizes the data in the data body;

iii) the address code comprises a multiplicity of code terms; and b) inputting additional data by organizing said additional data into data threads and appending said additional data to the existing database;

c) retrieving data from the database by comparing one or more queries in the form of query codes with the address code of each of the data threads in the data base;

d) producing a hit for each data thread whose address code contains the query code; and e) displaying the data threads corresponding to each hit, and wherein the terms of the address code are organized in the form of a meta-language comprising nouns representing events and objects and verbs representing actions.

7. The process of claim 6, wherein the nouns comprise root terms and one or more root modifiers which, together with the root terms, form noun declensions.

8. The process of claim 7, wherein the verbs comprise root terms and one or more root modifiers which, together with the root terms, form verb conjugations.

9. The process of claim 8, wherein the code terms in the address codes further comprise derivatives which signify that the sequence of other code terms in the address code is significant.

10. The process of claim 9 wherein the code terms in the address codes further comprise extension codes, operators, punctuation and literal strings.

11. A computer-implemented process for database organization, storage and retrieval comprising:

a) organizing the database data into data threads wherein, for each data thread;
  i) the data thread comprises an address code and a data body;
  ii) the address code characterizes the data in the data body;
  iii) the address code comprises a multiplicity of code terms; and b) inputting additional data by organizing said additional data into data threads;

c) appending said additional data to the existing database;

d) retrieving data from the database by comparing one or more queries in the form of query codes with the address code of each of the data threads in the data base;

e) producing a hit for each data thread whose address code contains the query code;

f) displaying the data threads corresponding to each hit;

g) providing a data dictionary in the form of a Bible, wherein the Bible contains a multiplicity of entries, each entry comprising:
  i) a description of the entry;
  ii) a query code for the entry; and
  iii) an address code for the entry;

h) constructing queries satisfying the description in accordance with the query codes in the Bible; and i) constructing address codes satisfying the description for each data thread in accordance with the address codes in the Bible;

wherein the terms of the address code are organized in the form of a meta-language comprising nouns representing events and objects and verbs representing actions.

12. The process of claim 11, wherein the nouns comprise root terms and one or more root modifiers which, together with the root terms, form noun declensions.

13. The process of claim 12, wherein the verbs comprise root terms and one or more root modifiers which, together with the root terms, form verb conjugations.

14. The process of claim 13, wherein the code terms in the address codes further comprise derivatives which signify that the sequence of other code terms in the address code is significant.

15. The process of claim 14 wherein the code terms in the address codes further comprise extension codes, operators, punctuation and literal strings.

* * * * *